(12) United States Patent
Le Huerou et al.

(10) Patent No.: US 10,887,264 B2
(45) Date of Patent: Jan. 5, 2021

(54) METHOD OF PLAYBACK OF A PLURALITY OF MESSAGES EXCHANGED WITH A CONVERSATIONAL AGENT

(71) Applicant: Orange, Paris (FR)

(72) Inventors: Emmanuel Le Huerou, Chatillon (FR); Francois Toutain, Chatillon (FR); Eric Beaufils, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/335,443

(22) PCT Filed: Sep. 27, 2017

(86) PCT No.: PCT/FR2017/052602
§ 371 (c)(1),
(2) Date: Mar. 21, 2019

(87) PCT Pub. No.: WO2018/060598
PCT Pub. Date: Apr. 5, 2018

(65) Prior Publication Data
US 2020/0021548 A1 Jan. 16, 2020

(30) Foreign Application Priority Data
Sep. 30, 2016 (FR) ...................... 16 59425

(51) Int. Cl.
*G06F 15/16* (2006.01)
*H04L 12/58* (2006.01)

(52) U.S. Cl.
CPC .............. *H04L 51/16* (2013.01); *H04L 51/02* (2013.01); *H04L 51/046* (2013.01)

(58) Field of Classification Search
CPC ........ H04L 51/16; H04L 51/02; H04L 51/046
USPC .......................................... 709/206
See application file for complete search history.

(56) References Cited

U.S. PATENT DOCUMENTS

| | | | | |
|---|---|---|---|---|
| 8,489,696 B2* | 7/2013 | Cross | ...................... | H04L 51/04 709/206 |
| 8,745,272 B2* | 6/2014 | Casalaina | ............... | H04L 41/22 709/248 |
| 8,893,215 B2* | 11/2014 | Burghart | ............... | G06F 21/604 726/1 |
| 8,903,365 B2* | 12/2014 | Stricklen | ................. | H04W 8/22 455/418 |

(Continued)

OTHER PUBLICATIONS

International Preliminary Report on Patentability and English translation of the Written Opinion of the International Searching Authority dated Apr. 2, 2019, for corresponding International Application No. PCT/FR2017/052602, filed Sep. 27, 2017.

(Continued)

*Primary Examiner* — Melvin H Pollack
(74) *Attorney, Agent, or Firm* — David D. Brush; Westman, Champlin & Koehler, P.A.

(57) ABSTRACT

A method of playback on a terminal of a plurality of messages exchanged by way of a communication network between the terminal and a conversational agent. The method includes obtaining an identifier of the conversational agent; obtaining, as a function of the identifier obtained, at least one playback rule for the messages exchanged; and implementing the at least one playback rule when a message is sent or received.

11 Claims, 4 Drawing Sheets

(56) References Cited

U.S. PATENT DOCUMENTS

Figure 1:
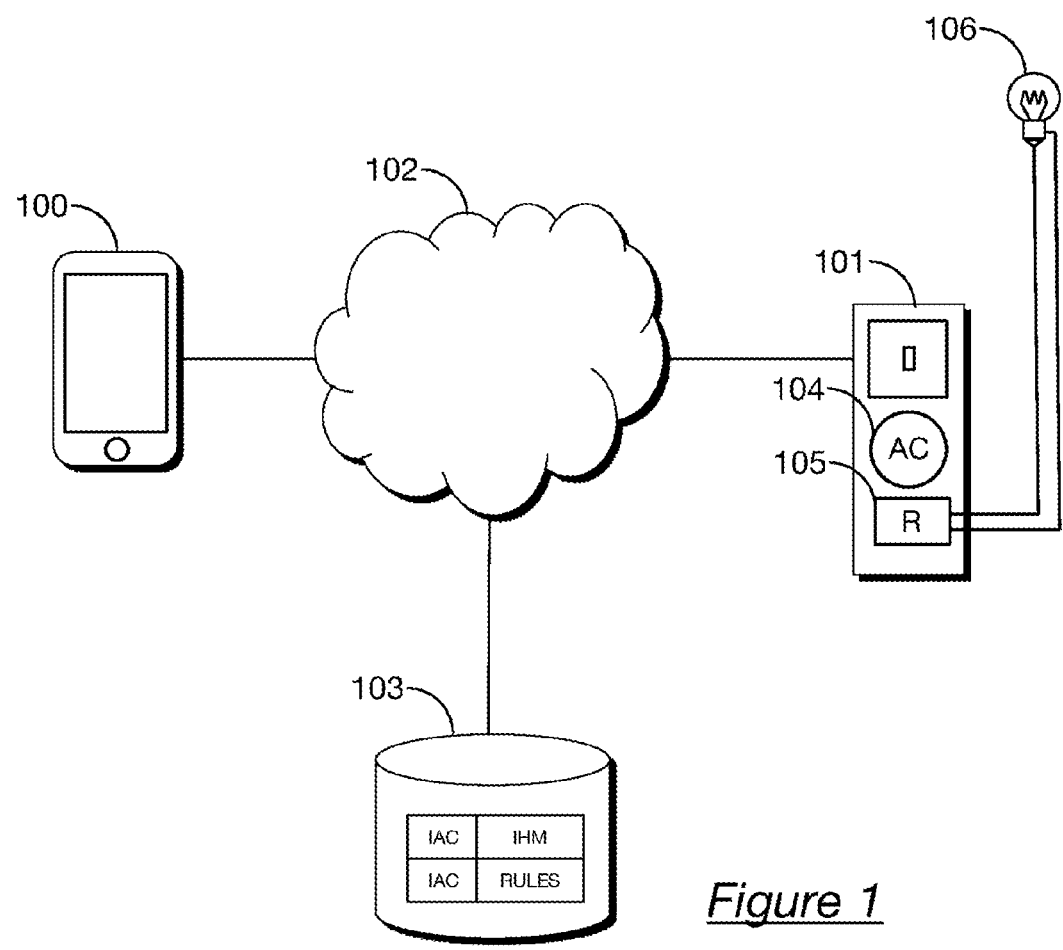

| | | | |
|---|---|---|---|
| 9,124,546 B2* | 9/2015 | Sharp | H04L 51/36 |
| 9,148,394 B2* | 9/2015 | Lynch | H04L 51/046 |
| 9,262,175 B2* | 2/2016 | Lynch | G06Q 10/02 |
| 9,276,802 B2* | 3/2016 | Lynch | H04L 29/08081 |
| 9,311,426 B2* | 4/2016 | Stovicek | G06F 16/9577 |
| 9,679,300 B2* | 6/2017 | Lynch | G06Q 30/0201 |
| 9,917,802 B2* | 3/2018 | Melzer | G06Q 30/06 |
| 10,033,672 B1* | 7/2018 | Morris | G06F 9/451 |
| 10,110,548 B2 | 10/2018 | Clarke | H04L 51/34 |
| 10,142,908 B2* | 11/2018 | Barak | H04W 8/26 |
| 10,152,229 B2* | 12/2018 | Peled | G06Q 30/06 |
| 10,187,337 B2* | 1/2019 | Smullen | H04L 67/322 |
| 10,278,065 B2* | 4/2019 | Stuber | G06F 9/452 |
| 10,353,552 B1* | 7/2019 | Morris | H04N 21/4852 |
| 10,419,374 B1* | 9/2019 | Morris | H04L 51/00 |
| 10,482,184 B2* | 11/2019 | Gelfenbeyn | G06F 40/35 |
| 2014/0122083 A1* | 5/2014 | Xiaojiang | H04L 51/02 704/270.1 |
| 2014/0156992 A1* | 6/2014 | Medin | H04L 63/123 713/168 |
| 2014/0164953 A1* | 6/2014 | Lynch | G06F 3/0481 715/753 |
| 2014/0172999 A1* | 6/2014 | Morris | H04L 67/32 709/206 |
| 2016/0110322 A1* | 4/2016 | Miller | G06F 3/048 715/758 |
| 2016/0259767 A1* | 9/2016 | Gelfenbeyn | G06F 40/35 |
| 2016/0260029 A1* | 9/2016 | Gelfenbeyn | G06F 40/30 |
| 2017/0078226 A1* | 3/2017 | Daly | H04W 4/90 |
| 2018/0033053 A1* | 2/2018 | Barak | G06Q 30/0271 |
| 2018/0212904 A1* | 7/2018 | Smullen | H04L 51/02 |
| 2019/0132381 A1* | 5/2019 | Momchilov | G06F 3/1454 |

OTHER PUBLICATIONS

International Search Report dated Jan. 11, 2018 for corresponding International Application No. PCT/FR2017/052602, filed Sep. 27, 2017.

Written Opinion of the International Searching Authority dated Jan. 11, 2018 for corresponding International Application No. PCT/FR2017/052602, filed Sep. 27, 2017.

* cited by examiner

# METHOD OF PLAYBACK OF A PLURALITY OF MESSAGES EXCHANGED WITH A CONVERSATIONAL AGENT

CROSS-REFERENCE TO RELATED APPLICATIONS

This Application is a Section 371 National Stage Application of International Application No. PCT/FR2017/052602, filed Sep. 27, 2017, which is incorporated by reference in its entirety and published as WO 2018/060598 A1 on Apr. 5, 2018, not in English.

TECHNICAL FIELD

The present invention relates to the field of telecommunications and pertains more particularly to a method of playback for rendering a plurality of messages exchanged between a terminal and a communication device.

PRIOR ART

The public has for some years demonstrated a strong craze for communications of instant messaging type. Indeed, this mode of communication affords more interactivity than communication by email while being less intrusive than voice communication. Mass public adoption of this mode of communication and the arrival on the market of touchscreen mobile terminals has been accompanied by advances in user interfaces making it possible to facilitate this mode of communication. These advances in user interfaces are today converging toward a conversational view in which the messages sent and the messages received are presented in bubbles arranged on either side of the screen of the terminal and ordered chronologically. Barring a few exceptions, this type of presentation in conversation form is predominant on most terminals, all brands considered.

This type of communication is now so pervasive that today it is no longer reserved for exchanges between physical people. Indeed, today it is possible to exchange messages with robots capable of interpreting messages sent by users and of responding thereto in a more or less relevant way. It is possible to cite for example robots specializing in meteorological forecasts capable of responding to messages of the type "what will the weather be tomorrow in Paris?". Thus, a user has a unified interface for communicating with other users and for accessing services. This type of robot capable of interacting with users by exchanging messages is sometimes called a "conversational agent".

The use of this type of communication is expanding still further today with the advent of "conversational commerce". Conversational commerce implements robots adapted to allow users to place orders for goods or services. Thus, users need no longer download a dedicated application or access a Web site to place an order, and the service provider does not need to publish and to maintain an application or a Web site.

Instant messaging can also be used to communicate with connected objects. Such a practice allows users to dispense with the downloading of an application dedicated to driving the object. For example, there exist circuit breakers adapted to be controlled by messages of SMS type sent to a number associated with the socket. Thus, when the user sends the message "ON" to a telephone number associated with the circuit breaker, the latter interprets the message and actuates a relay making it possible to close an electrical circuit. Of course, connected objects of this type can accept commands of any sort, such as for example commands aimed at ascertaining the state of the circuit breaker. Thus, by sending for example a "STATE" message to a circuit breaker such as that mentioned above, the user will be able to receive in response a message giving an item of information on the open or closed state of the electrical circuit controlled by the circuit breaker.

Although, as has been seen, this type of interaction presents undeniable advantages, in particular for users in terms of uniqueness of user experience and reduction in the number of applications required in order to access the services, the presentation of the exchanges of messages in conversation form such as it is implemented today on a majority of terminals poses certain problems.

In particular, this mode of communication is not always suitable for exchanges with conversational agents integrated into connected objects.

For example, in the case of the circuit breaker described above, the various control messages sent by the user as well as the response messages returned by the conversational agent generate a significant number of messages over time. These messages are stored by the terminal and displayed in the interface of the instant messaging application used to communicate with the device. However, the history of the control messages and of the responses is of no interest to the user, since only the last known state of the circuit breaker is useful to the user. Thus, the storage of obsolete messages occupies space unnecessarily in the memory of the terminal, and the display of a long sequence of "ON" and "OFF" states may seem confused to the user and cause the latter to err.

A need therefore exists to optimize the management of messages during communications with a conversational agent through an instant messaging application.

SUMMARY OF THE INVENTION

To this effect, the invention relates, according to a first aspect, to a method of playback for rendering, on a terminal, a plurality of messages exchanged by way of a communication network between the terminal and a conversational agent.

Such a method of playback is noteworthy in that it comprises the following steps:
Obtaining an identifier of the conversational agent,
Obtaining, as a function of the identifier obtained, at least one playback rule for rendering the messages exchanged, and
Implementing the at least one playback rule when a message is sent or received.

On the basis of an identifier of the device or of a conversational agent, the method obtains a rule for managing the messages exchanged which is adapted to process and present the messages exchanged with the device or the conversational agent. Such a playback rule can be obtained on the basis of a server, of a local database of the terminal or by any other means. For example, in the case where a terminal exchanges messages with a circuit breaker such as discussed above, the terminal obtains an identifier of the circuit breaker or of the conversational agent integrated into the circuit breaker. On the basis of this identifier, the terminal obtains one or more rules for managing the messages exchanged with the circuit breaker. Such rules make it possible for example to determine messages which can be erased or which must be preserved. These rules may also relate to certain arrangements as regards the way in which the messages received or sent are displayed on the screen of the terminal. The messages can thus be rendered in an optimal manner on the terminal.

Within the framework of this description, conversational agent is understood to mean an automaton adapted to respond automatically to messages sent by a user. Such a conversational agent is in particular adapted to interpret commands or key words included in messages that it receives.

The identifier of the conversational agent makes it possible to deduce the behavior of the agent, that is to say the various types of messages that it is capable of sending or of receiving. Such an identifier may correspond for example to a particular category of conversational agent, to a version of a particular conversational agent.

According to a particular embodiment, the method is such that the identifier of the conversational agent is obtained from a message.

The method makes it possible to identify the device or the conversational agent with which the messages are exchanged on the basis of an identification datum obtained on the basis of a message transmitted by the device or the conversational agent. The identification datum may for example be included in a particular field of the message, in the body of the message or it may also consist of a dispatch address for the message. In this manner, there is no need for a user of the terminal to identify the remote device himself in order to obtain the corresponding management rules.

According to a particular embodiment, the method is such that the identifier of the conversational agent is obtained from a database associated with the terminal.

A datum making it possible to identify the conversational agent can be obtained from a database of the first device. For example, the identification datum can be stored in an address book of the terminal in the entry for a contact corresponding to the device or to the service implementing the conversational agent. Thus, when a message is received or sent to the conversational agent, the terminal can perform a query in the address book to determine an identifier of the conversational agent.

According to a particular embodiment, the method is such that the step of implementing the at least one rule comprises the deletion of at least one message exchanged previously when a new message is exchanged.

On receipt of a particular message originating from a conversational agent, or else when a particular message is sent destined for this agent, the playback rule is implemented. The implementation of this rule can comprise the execution of a command for deleting certain messages received or sent previously. For example, the reception of a message originating from a conversational agent indicating that a circuit breaker is in the closed state may trigger the deletion of all the messages received previously relating to the state of the circuit breaker. Such an arrangement makes it possible to prevent obsolete messages from unnecessarily occupying the memory of the terminal and helps to make the current state of a device or of a service with which a conversational agent is associated more readable.

According to a particular embodiment, the method is such that it furthermore comprises a step of obtaining a user interface description as a function of the identifier obtained and a step of rendering on a screen of the terminal a user interface corresponding to said description.

The identifier of the conversational agent makes it possible to determine the messages that it might send as well as the commands that it can accept. The method then proposes to obtain, for example by downloading it from a server, a description of a user interface adapted to present the messages in an optimal manner on the terminal. The user interface of the terminal can thus adapt automatically to new services or devices that are controllable by instant messaging. In this manner, when a user acquires a new connected device, a suitable control interface will immediately be available for the user.

According to a particular embodiment, the method is such that the at least one playback rule comprises an association between a particular message and an element of the user interface rendered.

The method thus proposes to associate a user-interface element with a particular message. For example, the rule can comprise an association between the reception of a message containing the key word "ON" with a pictogram representing a bulb. In this manner, on receipt of a message indicating that a connected circuit breaker is in the closed state, the terminal may display for example a pictogram representing a lit bulb, the history of the previous messages not being presented on the screen. The method thus makes it possible to present the item of information contained in the messages in an optimal manner, thus making it possible to prevent the user of the terminal from being caused to err by a multitude of obsolete text messages relating to the previous states of the circuit breaker. Such an arrangement also makes it possible to optimize the space occupied on the screen of a terminal, the item of information conveyed in the message being presented in a more compact manner. According to a particular embodiment, the method is such that the at least one playback rule comprises an association between a message to be transmitted and an element of the user interface.

A pre-formatted message can be associated with a user interface interaction element. Thus, the user can cause a control message to be sent destined for the conversational agent by a simple action on a button. Such an arrangement allows the user to control easily and speedily a device associated with a conversational agent which interacts through instant messaging.

According to a particular embodiment, the method is noteworthy in that at least one playback rule is included in a message received and/or at least one user-interface description is included in a message received.

The method thus envisages that a playback rule for rendering the messages is included in a message originating from the conversational agent and received by the terminal. Thus, the terminal immediately obtains a suitable rule adapted to render one or more messages exchanged, without directing any query to a server. One or more user-interface descriptions may also be included in a message. This may entail a dedicated message sent by a conversational agent in response to a particular query.

According to another aspect, the invention relates to a playback device for rendering a plurality of messages exchanged by way of a communication network between the device and a conversational agent, the device being noteworthy in that it comprises means:

for obtaining an identifier of the conversational agent,
for obtaining, as a function of the identifier obtained, at least one playback rule for rendering the messages exchanged,
for implementing the at least one playback rule when a message is sent or received.

According to a particular embodiment, the invention relates to a terminal comprising a playback device for rendering a plurality of messages.

In a particular embodiment, the various steps of the method according to the invention are determined by instructions of computer programs.

Consequently, the invention also envisages a computer program comprising instructions for the execution of the steps of the method of playback, when said program is executed by a processor.

Such a program can use any programming language, and be in the form of source code, object code, or of code intermediate between source code and object code, such as in a partially compiled form, or in any other desirable form.

Finally, the invention relates to an information medium readable by a processor on which is recorded a computer program comprising instructions for the execution of the steps of the method of playback.

The information medium can be any entity or device capable of storing the program. For example, the medium can comprise a storage means, such as a ROM, for example a CD ROM or a microelectronic circuit ROM, or else a magnetic recording means, for example a diskette (floppy disk) or a hard disk. Moreover, the information medium can be a transmissible medium such as an electrical or optical signal, which can be conveyed via an electrical or optical cable, by radio or by other means. The program according to the invention can in particular be downloaded over a network of Internet type. Alternatively, the information medium can be an integrated circuit into which the program is incorporated, the circuit being adapted to execute or to be used in the execution of the method in question.

The aforementioned various embodiments or characteristics thereof may be added, independently or in combination with one another, to the steps of the method of playback such as is defined hereinabove.

The terminals, devices and programs exhibit at least advantages analogous to those conferred by the method of playback described hereinabove.

LIST OF FIGURES

Figure 2:
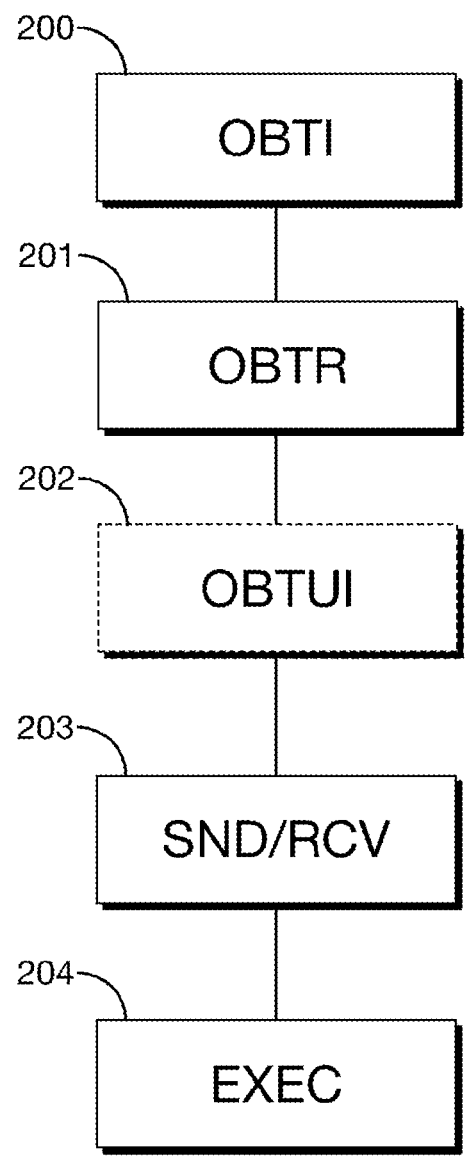
Figure 3A:
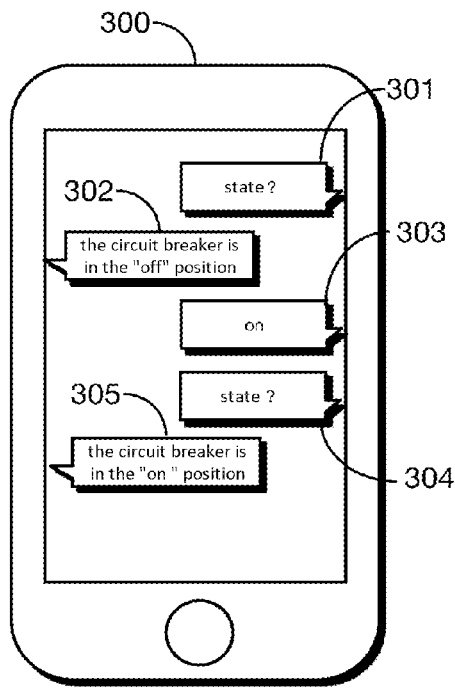
Figure 3B:
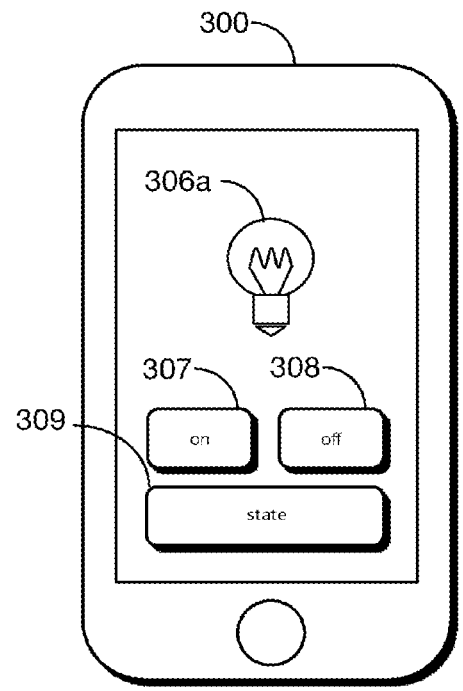
Figure 3C:
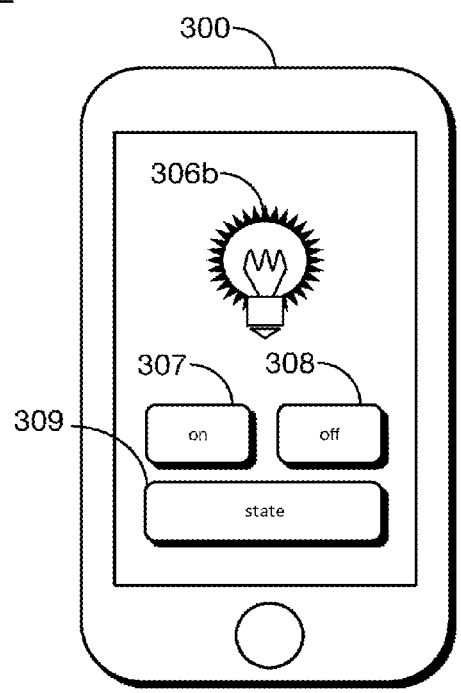
Figure 4:
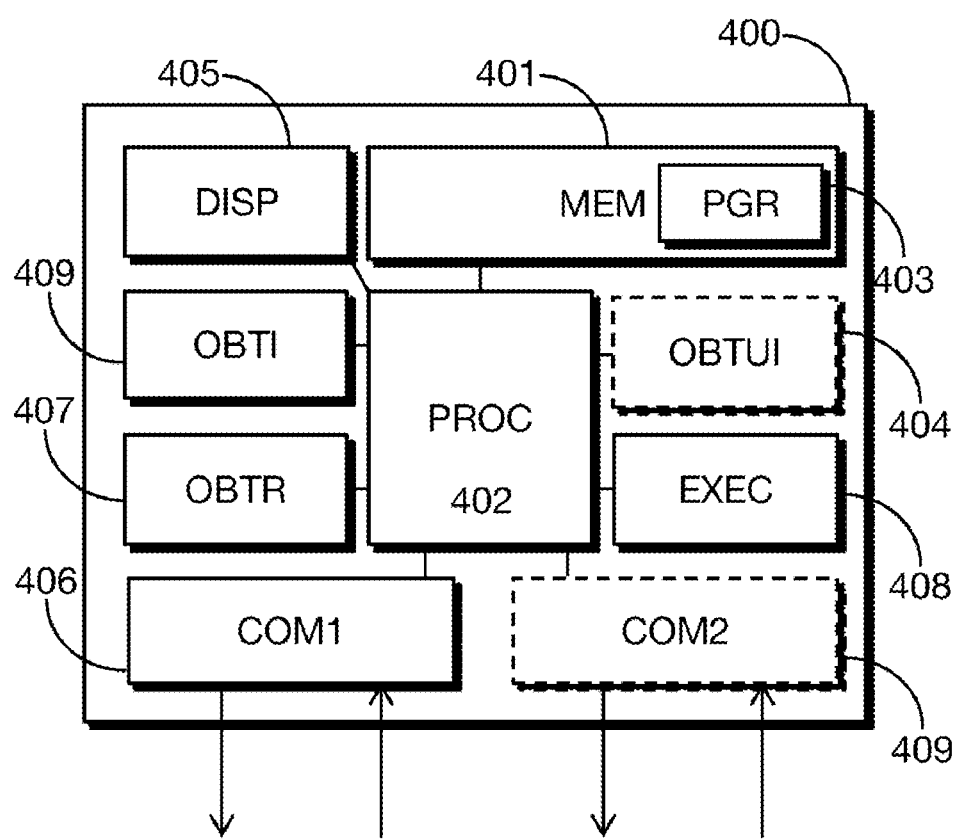

Other characteristics and advantages of the invention will become more clearly apparent on reading the following description of a particular embodiment, given by way of simple illustrative and nonlimiting example, and of the appended drawings, among which:

FIG. 1 illustrates an architecture adapted to implement the method of playback according to a particular embodiment of the invention, FIG. 2 illustrates the main steps of the method of playback according to a particular embodiment, FIG. 3a represents a conversation with a conversational agent on a mobile terminal according to the prior art, FIGS. 3b and 3c represent an interface for communication with a conversational agent according to the invention, FIG. 4 represents the architecture of a device adapted to implement the invention according to a particular embodiment.

DETAILED DESCRIPTION

FIG. 1 illustrates an architecture adapted to implement the method of playback according to a particular embodiment of the invention. Such an architecture comprises a communication terminal 100 configured to communicate through a communication network 102 with a device 101 and a server 103.

The communication network can be a cellular network such as a GSM, 3G or else 4G network, or else still an Internet network which the terminal can access by way for example of a Wifi connection. According to a particular embodiment of the invention, the terminal 100 communicates with the device 101 by exchanging messages of SMS type by way of a first network of GSM type and communicates with the database 103 by way of a second network of Internet type for example.

The terminal 100 is here a mobile telephone of "smartphone" type having at its disposal communication means adapted to connect to one or more communication networks, such as Wifi networks or cellular networks, and also having a memory and a processor which are configured to execute computer program instructions. The invention described hereinafter may however be implemented on other terminals, such as on a tablet or else personal computer. The terminal 100 is furthermore adapted to communicate according to at least one instant messaging protocol with other terminals or devices. For example, the terminal 100 can send and receive messages of SMS (Short Message Service) type by way of a cellular network, or else implement the RCS (Rich Communication Suite) standard, the SIP SIMPLE or Jabber protocol or any other protocol adapted to send and receive messages. In particular, the terminal 100 can exchange instant messages with the device 101 through the network 102.

The device 101 is a connected object having at its disposal communication means adapted to connect to a communication network such as the network 102 and receive commands originating from other devices. Accordingly, the device 101 comprises a network interface such as for example a Wifi, GSM or 3G or 4G interface allowing it to exchange data with other devices, and in particular with the terminal 100.

According to a particular embodiment, the device 101 is a connected circuit breaker comprising a relay configured to open or close an electrical circuit as a function of commands received by way of the network 102. However, the invention is not limited to a connected object such as this and may relate to other more or less complex types of devices or services adapted to be controlled by exchanges of messages of instant message types such as SMS, MMS or other instant message exchange protocols. For example, it may entail a local control device for controlling other equipment, such as a home-automation control center adapted to drive a heating or air-conditioning system, or a system for automatically closing blinds or any other remotely controllable apparatus.

The circuit breaker 101 furthermore comprises a conversational agent 104 adapted to interpret and respond automatically to commands transmitted by the terminal 100. Accordingly, the conversational agent comprises a module for interpreting the messages received. Such an interpreting module can comprise a syntactic and/or semantic analyzer adapted to deduce a command on the basis of a message drafted in natural language by a user. In a particular embodiment, the conversational agent 104 is implemented by a computer program comprising instructions adapted to interpret the content of messages received, control a relay 105 according to the interpreted messages and send messages relating to the state of the relay 105. The conversational agent 104 of the device 101 is configured to execute certain actions on receiving certain messages. For example, the conversational agent 104 can be configured to close the electrical circuit 106 with the aid of the relay 105 when a message containing the key word "on" is received and to open the electrical circuit 106 with the aid of the relay 105 when a message containing the key word "off" is received. The conversational agent 104 is furthermore configured to automatically send a message containing an indication about the open or closed state of the circuit 106 when it receives a message containing the key word "state". Thus, the terminal 100 can control the circuit breaker 101 by sending "on" and "off" messages destined for the circuit breaker 101 and ascertain the state of the circuit breaker by sending the "state" message.

A conversational agent can be adapted to receive a more or less significant number of different commands depending on the device or the service with which it is associated, said commands possibly comprising parameters. For example, a conversational agent configured to control a domestic heating system can accept commands comprising one or more temperature parameters. According to another example, such a conversational agent can be associated with an on-line service, such as for example a booking service, and can then be configured to receive messages comprising complex commands supplemented with parameters, such as for example times for the start and end of bookings, and to send complex response messages, likewise comprising parameters varying from message to message.

An identifier IAC is associated with the conversational agent 104 of the device 101. This identifier is associated in an unambiguous manner with the behavior of the conversational agent, that is to say with the commands that it is capable of interpreting and with the responses that it might send.

The architecture of FIG. 1 also comprises a database 103. This database is for example located in a server accessible from the terminal 100 by way of the network 102. The terminal 100 can interrogate the database 103 on the basis of http or SQL queries, or via other types of suitable queries. According to a particular embodiment, the database 103 is located in the terminal 100 and is accessible directly through an API (Application Programming Interface) provided for this purpose. The database 103 makes it possible in particular to store data in association with the identifier of the conversational agent 101.

According to a particular embodiment, the database 103 stores, in association with an identifier of a conversational agent, at least one playback rule for rendering the messages exchanged between a terminal and the identified conversational agent. Thus, a terminal such as the terminal 100 can obtain one or more playback rules in respect of the messages by directing a query to the database 103, the query comprising the identifier of the conversational agent with which the messages are exchanged.

A playback rule within the meaning of the invention makes it possible to describe the way in which the messages received or sent by a terminal are presented to the user and/or stored by the terminal, with the aim of optimizing the readability of the information presented to the user and thus of limiting the risks of interpretation errors by the user, such errors possibly leading to technical incidents. Such, an optimization of the presentation of the messages makes it possible furthermore to reduce the memory space occupied by obsolete or unnecessary messages.

For example, a playback rule may envisage that on receipt by the terminal 100 of a message comprising an indication relating to the state of the circuit breaker 101, all the previous messages are deleted. With reference to FIG. 3a, such a playback rule may envisage that on receipt of the message 305, the messages 301, 302, 303 and 304 are deleted, the only relevant item of information for the user being the indication contained in the message 305.

According to a particular embodiment of the invention, the database 103 stores, in association with a conversational agent identifier, a user interface description. Such a description can consist of a file in the HTML or XML format, or any other format suitable for describing a user interface. Thus, a terminal such as the terminal 100 can obtain from the database a description of a user interface as a function of the identifier of a conversational agent and render a suitable interface adapted to format the messages exchanged with the conversational agent whose identifier is associated with the interface description, in such a way as to present in an optimal manner the item of information contained in the messages exchanged.

According to a particular embodiment, a playback rule comprises an association between a particular message and an element of the user interface rendered. For example, a playback rule can envisage that on receipt by the terminal 100 of a message relating to the state of the circuit breaker, a user-interface element is modified to reflect an item of information transmitted in the message.

FIGS. 3b and 3c illustrate an exemplary user interface adapted to render messages exchanged between the terminal 100 and the conversational agent of the device 101. Such an interface is rendered by the terminal 100 on the basis of a description associated with an identifier of the conversational agent and obtained from the database 103. The pictogram 306a and 306b of FIGS. 3b and 3c is associated with the receipt of a message comprising an indication relating to the state of the device 101. A playback rule obtained from the database 103 associates in this example the receipt of the message 302 with the display of the pictogram 306a and the receipt of the message 305 with the display of the pictogram 306b. Thus, the user knows immediately which state the circuit breaker is in, without having to scan through the history of the messages to determine the current state of the circuit breaker.

When the conversational agent of a device such as for example a home-automation platform or an on-line booking service is configured to exchange messages comprising complex information supplemented for example with parameters that may vary from one message to the next, such as time slots, transaction tariffs, temperatures or any other parameter that may vary for a given type of response, a playback rule can comprise a formal description of the message, adapted to extract the relevant information therefrom. This formal description can correspond to a regular expression, syntactic rules or a grammar on the basis of which a syntactic and semantic analyzer of the terminal 100 can extract the relevant information from the messages received so that it can be associated, through playback rules, with user-interface elements.

According to a particular embodiment of the invention, a playback rule comprises an association between a message to be transmitted and an element of the user interface. For example, a playback rule obtained from the database 103 may envisage that the button 307 represented in FIG. 3b is associated with the sending of a message such as the message 303 of FIG. 3a. Thus, a simple interaction of the user on the button 307 allows the preparation of a message adapted to cause the closing of the electrical circuit 106 and the sending of this message destined for the conversational agent. The user does not have to compose the message himself, thus making it possible to avoid errors related for example to typing errors or to the ignorance of commands specific to the device and making the control operation faster. Likewise, interaction elements 308 and 309 may be associated with the sending of messages making it possible respectively to open and to ascertain the state of the circuit 106. According to a particular embodiment, an interaction element may be associated with the transmission of several control messages. For example, the button 307 can be associated with the consecutive transmission of the messages 303 and 304.

Such an association between a rule and a user-interface element can be achieved by identifying in a unique manner on the one hand each interface element in the description of the user interface and on the other hand each type of message that can be sent or received by the conversational agent. In this way, a playback rule can refer to a particular message and a particular interface element so as to associate the sending or the receiving of a message with an interface element.

FIG. 2 illustrates the main steps of the method of playback according to a particular embodiment of the invention.

During a first step 200, the terminal 100 obtains an identifier of the conversational agent AC of the device 101. As set forth previously, such an identifier is determined by the messages that the conversational agent is capable of interpreting and response that it can transmit. In a general manner, the identifier is representative of the automaton which governs the various states and inputs-outputs of the conversational agent. This may entail for example a telephone number, a URL or a part of a URL, a serial number or else a unique number such as a GUID (abbreviation of the English Globally Unique IDentifier).

According to a particular embodiment, the identifier of the conversational agent is obtained on the basis of a received message originating from the conversational agent. The identifier may be included in a header of a message or else in the body of a message sent by the conversational agent. It may entail for example a telephone number used by the communication interface of the device into which the conversational agent is integrated.

According to a particular embodiment, the identifier of the conversational agent is obtained from a database associated with the terminal. The identifier may thus have been stored on the terminal during a prior configuration phase. It may entail an address book local to the terminal or else a network address book associated with the terminal. According to a particular embodiment, a configuration phase is initiated when the details of the device are added to an address book of the terminal. This configuration phase can include an initial exchange of messages in the course of which the device transmits to the terminal configuration data comprising in particular an identifier of the conversational agent. Alternatively, such an initial configuration phase can comprise the inputting by the user of an identifier provided for example in a documentation of the device. The identifier can also be transmitted to the terminal by the optical reading of a two-dimensional code or barcode, or else by way of an NFC (Near Field Communication) communication.

In step 201, the terminal obtains at least one playback rule for rendering the messages exchanged as a function of the identifier of the conversational agent obtained in step 200.

Accordingly, the terminal 100 interrogates the database 103 so as to obtain one or more playback rules associated with the identifier. The interrogation can be done by means of an http or SQL query containing the identifier of the conversational agent. In return, the terminal receives one or more playback rules. These rules can be transmitted in any appropriate format, such as for example in a message complying with the XML format.

According to a particular embodiment of the invention, a playback rule is obtained on the basis of a message originating from the device 101, the rule being included in the message. The message comprising the playback rule can be obtained subsequent to the sending by the terminal of a command destined for the device 101, the command comprising an indication according to which at least one playback rule for rendering the messages is requested. Thus, the terminal can obtain one or more playback rules directly on the basis of the device, without involving a third-party server.

During an optional step 202, the terminal obtains a user-interface description as a function of the identifier obtained in step 200 and renders on a screen of the terminal a user interface corresponding to said description obtained.

Accordingly, the terminal 100 interrogates the database 103 so as to obtain one or more playback rules associated with the identifier. The interrogation of the database can be done by means of an http or SQL query containing the identifier of the conversational agent. In return, the terminal receives the description of a user interface adapted to present the messages. The user interface can be a graphical interface intended to be displayed on a screen of the terminal. As a variant, the interface can be a voice interface or else a haptic interface.

According to a particular embodiment of the invention, the description of a user interface suitable for the messages that may be interpreted and sent by the conversational agent of the device 101 is obtained on the basis of a message originating from the device 101, the interface description being included in the message received by the terminal. The message comprising the playback rule can be obtained subsequent to the sending by the terminal of a command destined for the device 101, the command comprising an indication according to which at least one user interface is requested. Thus, the terminal can obtain an interface description adapted to present the exchanges with the device 101 directly on the basis of the device, without involving a third-party server.

The receiving or the sending of a message in step 203 triggers the implementation of at least one playback rule in step 204. During this step, a playback rule corresponding to the message sent or received is selected and then applied to one or more messages exchanged with the device 101. For example, the reception of a change-of-state notification message originating from the device 101 from an "open circuit" state to a "closed circuit" state, such as for example the message 305 represented in FIG. 3a, can trigger the execution of a rule according to which previously received messages of the same type, such as for example the message 302 of FIG. 3a, are deleted from the history. Such an arrangement makes it possible to prevent the screen of the terminal from being congested by obsolete messages reflecting for example a past state of the device. According to a particular embodiment, when a user-interface description has been obtained, the receiving or the sending of a message can trigger a modification of one or more interface elements in such a way as to reflect the item of information contained in the message. For example, the reception of the message 305 represented in FIG. 3a whilst an interface in accordance with a description obtained in step 202 is rendered on the screen of the terminal, can trigger the replacement of the pictogram 306a representing an unlit bulb by the pictogram 306b of FIG. 6 which represents a lit bulb. The user can thus immediately ascertain the state of the circuit controlled by the circuit breaker 101.

Thus, the method of playback according to the present invention makes it possible to improve the readability of the information exchanged with a device or service communicating by way of instant messaging. The presentation of the messages can furthermore be modified without intervening on the device or the service, by simply updating the data associated with the identifier of the conversational agent on a server or a database.

FIG. 4 illustrates the architecture of a device adapted to implement the method of playback.

The device comprises a storage space 401, for example a memory MEM, a processing unit 402 equipped for example with a processor PROC. The processing unit can be driven by a program 403, for example a computer program PGR, implementing the method of playback such as described in the invention with reference to FIG. 2, and in particular the steps of obtaining an identifier of the conversational agent, of obtaining, as a function of the identifier obtained, at least one playback rule for rendering the messages exchanged, and of implementing the at least one playback rule when a message is sent or received.

On initialization, the instructions of the computer program 403 are for example loaded into a RAM memory (Random Access Memory) before being executed by the processor of the processing unit 402. The processor of the processing unit 402 implements the steps of the method of playback according to the instructions of the computer program 403.

Accordingly, the device comprises an interface 406 to a communication network adapted to communicate with other devices, and in particular with a conversational agent configured to communicate according to an instant messaging protocol. The communication interface 406 is for example a module for access to a cellular network of GSM, 3G or 4G type adapted to exchange messages in accordance with an instant messaging protocol with a conversational agent, such as for example messages of SMS, SIP SIMPLE type or in accordance with the RCS standard. It may also entail a Wifi, Bluetooth or Ethernet interface allowing the device to communicate with the conversational agent by way of the Internet network or of a local network. Optionally, the device also comprises a second communication interface adapted to exchange messages with other devices by way of a second communication network. This second interface makes it possible in particular to exchange messages with a server hosting a database in which playback rules or descriptions of user interfaces are stored in association with an identifier of a conversational agent. It may entail a 3G, 4G, Wifi, Bluetooth or Ethernet interface allowing the device to communicate with a database by way of the Internet network.

The device 400 comprises means 409 for obtaining an identifier of the conversational agent. According to a particular embodiment, such means are adapted to obtain an identifier of a conversational agent on the basis of a received message originating from this agent. It may entail for example a computer program adapted to be loaded into the memory 401 and executed on the processor PROC of the processing unit 402, the program comprising instructions for obtaining a message originating from a conversational agent so as to extract therefrom an item of information for identification of the conversational agent. According to a particular embodiment, the means 409 are adapted to obtain an identifier of a conversational agent on the basis of a database associated with the terminal. It may entail for example a computer program adapted to be loaded into the memory 401 and executed on the processor PROC of the processing unit 402, the program comprising instructions for constructing an SQL query adapted to interrogate a database associated with the terminal, such as for example an address book, so as to obtain in response an identifier of the conversational agent.

The device 400 furthermore comprises means 407 for obtaining at least one playback rule associated with the identifier of a conversational agent. These means can correspond to a computer program adapted to be executed by the processor PROC of the processing unit 402. Such a program comprises instructions configured to construct an http or SQL query destined for a server hosting a database in which playback rules are stored in association with an identifier of a conversational agent, so as to transmit the query thus constructed to the server hosting the database and receive in response a message comprising a playback rule associated with the identifier transmitted in the query.

Optionally, the device 400 comprises means 404 for obtaining a user-interface description associated with an identifier of a conversational agent. These means can be implemented by a computer program adapted to be executed by the processor PROC of the processing unit 402. Such a program comprises instructions configured to construct an http or SQL query destined for an entity such as a server hosting a database in which user-interface descriptions are stored in association with identifiers of conversational agents, so as to transmit the query thus constructed to said entity hosting the database and receive in response a message comprising a user-interface description associated with the identifier transmitted in the query.

The device 400 also comprises a screen 405 adapted to render messages received and/or user interfaces. According to a particular embodiment, the screen comprises interaction means allowing the user of the terminal to interact with user-interface elements, said user-interface elements being able to be, in a particular embodiment, associated with a transmission rule for transmitting at least one message destined for a conversational agent with which the rule is associated. It may entail for example a touchscreen.

Finally, the device 400 comprises means for implementing the at least one playback rule obtained when a message is sent or received. These means can be implemented by a computer program adapted to be executed by the processor PROC of the processing unit 402. Such a program comprises instructions configured to carry out a syntactic analysis and an interpretation of the playback rule, a detection of the messages concerned in the rule on the basis of a type and/or a category of message received and/or sent, and the execution of an action on the messages concerned. Such an action may for example be a deletion of the message, a reordering of the messages, or else a replacing of a message by another message or by a predetermined content. The action can also consist of a modification of a user-interface element in response to the sending or on receipt of a particular message or of a message whose content is particular.

The device can be integrated into a terminal of smartphone, connected watch, tablet type or else a laptop computer.

The invention claimed is:

1. A method of playback for rendering, on a terminal, a plurality of messages exchanged by way of a communication network between the terminal and a conversational agent, the method comprising the following acts performed by a playback device:
   obtaining an identifier of the conversational agent,
   obtaining, as a function of the identifier obtained, at least one playback rule for rendering the messages exchanged with the conversational agent, and
   implementing the at least one playback rule when a message is sent to or received from the conversational agent.

2. The method as claimed in claim 1, wherein the identifier of the conversational agent is obtained from a message.

3. The method as claimed in claim 1, wherein the identifier of the conversational agent is obtained from a database associated with the terminal.

4. The method as claimed in claim 1, wherein the act of implementing the at least one rule comprises deletion of at least one message exchanged previously when a new message is exchanged.

5. The method as claimed in claim 1, further comprising the playback device obtaining a user interface description as a function of the identifier obtained and rendering on a screen of the terminal a user interface corresponding to said description.

6. The method as claimed in claim 5, wherein the at least one playback rule comprises an association between a particular message and an element of the user interface rendered.

7. The method as claimed in claim 5, wherein the at least one playback rule comprises an association between a message to be transmitted and an element of the user interface.

8. The method as claimed in claim 1, wherein the at least one playback rule is included in a message received and/or at least one user-interface description is included in a message received.

9. A playback device for rendering a plurality of messages exchanged by way of a communication network between the device and a conversational agent, the playback device comprising:
   a processor; and
   a non-transitory computer-readable medium comprising instructions stored thereon, which when executed by the processor configure the playback device to perform acts comprising:
   obtaining an identifier of the conversational agent,
   obtaining, as a function of the identifier obtained, at least one playback rule for rendering the messages exchanged with the conversational agent, and
   implementing the at least one playback rule when a message is sent to or received from the conversational agent.

10. The playback device as claimed in claim 9, wherein the playback devices is comprises in a terminal.

11. A non-transitory information medium readable by a computer on which is recorded a computer program comprising instructions for performing a method of playback for rendering, on a terminal, a plurality of messages exchanged by way of a communication network between the terminal and a conversational agent, when the instructions are executed by a processor of a playback device, the method comprising the following acts performed by the playback device:
   obtaining an identifier of the conversational agent,
   obtaining, as a function of the identifier obtained, at least one playback rule for rendering the messages exchanged with the conversational agent, and
   implementing the at least one playback rule when a message is sent to or received from the conversational agent.

* * * * *